(12) United States Patent
Ohata et al.

(10) Patent No.: US 9,341,788 B2
(45) Date of Patent: May 17, 2016

(54) OPTICAL MODULE

(75) Inventors: Nobuo Ohata, Tokyo (JP); Atsushi Sugitatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 124 days.

(21) Appl. No.: 13/812,342

(22) PCT Filed: Jul. 27, 2010

(86) PCT No.: PCT/JP2010/062614
§ 371 (c)(1),
(2), (4) Date: Jan. 25, 2013

(87) PCT Pub. No.: WO2012/014283
PCT Pub. Date: Feb. 2, 2012

(65) Prior Publication Data
US 2013/0121638 A1 May 16, 2013

(51) Int. Cl.
G02B 6/32 (2006.01)
G02B 6/42 (2006.01)

(52) U.S. Cl.
CPC .............. G02B 6/32 (2013.01); G02B 6/4204 (2013.01); G02B 6/4215 (2013.01)

(58) Field of Classification Search
CPC ........................................................ G02B 6/32
See application file for complete search history.

(56) References Cited

U.S. PATENT DOCUMENTS 5,066,089 A * 11/1991 Greil et al. ...................... 385/35
5,528,407 A 6/1996 Nakata et al.
6,012,854 A * 1/2000 Kyoya ............................. 385/88
6,700,698 B1 * 3/2004 Scott ............................. 359/347
6,721,511 B1 * 4/2004 Tatsuno et al. ................ 398/141
7,403,716 B2 7/2008 Lo et al.
7,821,703 B2 10/2010 Imanishi
2003/0030889 A1 * 2/2003 Sakai et al. .................... 359/333
2005/0074213 A1 * 4/2005 Lin et al. .......................... 385/88
2006/0280411 A1 * 12/2006 Nishizawa et al. ............. 385/93
2007/0098335 A1 * 5/2007 Baek et al. ....................... 385/93

(Continued)

FOREIGN PATENT DOCUMENTS

CN  2716853 Y  8/2005
CN  201388203 Y  1/2010

(Continued)

OTHER PUBLICATIONS

International Search Report Issued Sep. 14, 2010 in PCT/JP10/62614 Filed Jul. 27, 2010.

(Continued)

*Primary Examiner* — Hemang Sanghavi
*Assistant Examiner* — Kajli Prince
(74) *Attorney, Agent, or Firm* — Oblon, McClelland, Maier & Neustadt, L.L.P.

(57) ABSTRACT

An optical module includes a light emitting element, an optical fiber, a wavelength separating filter that is arranged at a predetermined angle with respect to a longitudinal direction of the optical fiber on a plane including the longitudinal direction of the optical fiber, and a lens for focusing light emitted from the light emitting element on the optical fiber via the wavelength separating filter. The light emitting element is arranged while being offset in a direction perpendicular to a central axis of the lens on a plane where the wavelength separating filter has the predetermined angle with respect to the central axis of the lens.

20 Claims, 8 Drawing Sheets

(56) References Cited

U.S. PATENT DOCUMENTS

2008/0101796 A1    5/2008    Iida et al.
2010/0086262 A1    4/2010    Kihara et al.

FOREIGN PATENT DOCUMENTS

| JP | 7 191237 | 7/1995 |
| JP | 10 246841 | 9/1998 |
| JP | 2005 202157 | 7/2005 |
| JP | 2006 351608 | 12/2006 |
| JP | 2007 232833 | 9/2007 |
| JP | 2007 232834 | 9/2007 |
| JP | 20072328333 * | 9/2007 |
| JP | 2007 279614 | 10/2007 |
| JP | 2008 129484 | 6/2008 |
| JP | 2008 176279 | 7/2008 |
| JP | 2008 182033 | 8/2008 |
| JP | 2009 210696 | 9/2009 |
| JP | 2009 222893 | 10/2009 |
| JP | 2010 91824 | 4/2010 |

OTHER PUBLICATIONS

Office Action issued on Apr. 30, 2014 in the corresponding Chinese Patent Application No. 201080068241.X (with partial English Translation).

Office Action issued Dec. 31, 2014 in Chinese Patent Application No. 201080068241.X (with English translation).

* cited by examiner

OPTICAL MODULE

FIELD

The present invention relates to an optical module.

BACKGROUND

Generally, a communication optical transceiver module that requires a wavelength separation of light includes a light emitting element for generating transmission signal light, a lens for focusing light emitted from the light emitting element to an optical fiber, a wavelength separating filter for separating wavelengths of the transmission signal light and reception signal light, a light receiving element for receiving the reception signal light output from the optical fiber, and a lens for focusing the light on the light receiving element (see, for example, Patent Literature 1 mentioned below). In such a communication optical transceiver module, upstream signal light emitted from the light emitting element passes through the lens and the wavelength separating filter, and is focused on the optical fiber. Meanwhile, downstream signal light output from the optical fiber is reflected at the wavelength separating filter, passes through the lens, and is focused on the light receiving element.

Generally, the wavelength separating filter used in the communication optical transceiver module described above is manufactured by forming a dielectric multilayer film on a parallel flat dielectric substrate. As the dielectric substrate, for example, BK7 having a refractive index of 1.5 and the like are used.

CITATION LIST

Patent Literature

Patent Literature 1: Japanese Patent Application Laid-open No. 2005-202157

SUMMARY

Technical Problem

However, in the conventional transmission optical transceiver module described above, the wavelength separating filter is arranged at an angle of about 45 degrees with respect to an optical fiber such that the reception signal light output from the optical fiber is reflected at an angle of about 90 degrees with respect to the optical fiber in order to separate the transmission optical signal and the reception optical signal. Because the transmission signal light generated from the light emitting element passes through the lens and the wavelength separating filter that is arranged at the angle of about 45 degrees, there has been a problem that an aberration is generated when the light passes through the wavelength separating filter, which causes degradation of the coupling efficiency to the optical fiber as compared to a case where the wavelength separating filter is not used. Particularly, when an aspheric lens is used, the influence becomes conspicuous. Furthermore, among various aberrations, an aberration that largely attributes to the degradation of the coupling efficiency to the optical fiber is astigmatism.

The present invention has been achieved in view of the above problems, and an object of the present invention is to provide an optical module that can suppress degradation of the coupling efficiency due to astigmatism to achieve a high coupling efficiency.

Solution to Problem

In order to solve the above problem and in order to attain the above object, an optical module of the present invention, includes: a light emitting element; an optical fiber; a wavelength separating filter that is arranged at a predetermined angle with respect to a longitudinal direction of the optical fiber on a plane including the longitudinal direction of the optical fiber; and a lens for focusing light emitted from the light emitting element on the optical fiber via the wavelength separating filter. Additionally, the light emitting element is arranged while being offset in a direction perpendicular to a central axis of the lens on a plane where the wavelength separating filter has the predetermined angle with respect to the central axis of the lens.

Advantageous Effects of Invention

The optical module according to the present invention can suppress degradation of the coupling efficiency due to astigmatism to achieve a high coupling efficiency.

DESCRIPTION OF EMBODIMENTS

Exemplary embodiments of an optical module according to the present invention will be explained below in detail with reference to the accompanying drawings. The present invention is not limited to the embodiments.

First Embodiment

Figure 1:
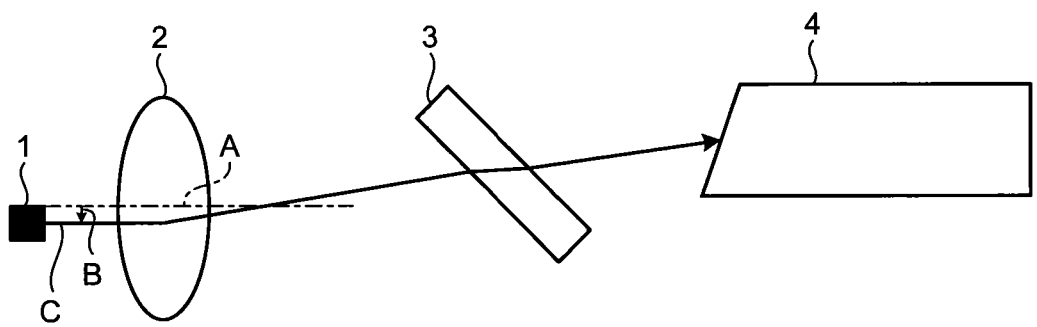
FIG. 1 is a configuration example of an optical module according to a first embodiment.

FIG. 1 is a configuration example of an optical module according to a first embodiment of the present invention. The optical module according to the present embodiment shown in FIG. 1 includes a light emitting element 1, a lens 2, a wavelength separating filter 3, and an optical fiber 4. The optical module according to the present embodiment is a communication optical transceiver module, for example. In a case of a communication optical transceiver module, the wavelength separating filter 3 separates wavelengths of a transmission optical signal and a reception optical signal, and the wavelength-separated reception optical signal is incident on a light receiving element (not shown). However, the optical module according to the present embodiment is not limited to a communication optical transceiver module, and can be any optical module in which light emitted from a light emitting element is focused on an optical fiber via a lens and a wavelength separating filter having an inclination, such as an optical transmission module that does not have a function of a reception module.

The light emitting element 1 according to the present embodiment is offset with respect to a central axis A of the lens 2 by an offset amount B. An optical path C shows an example of a path of the light emitted from the light emitting element 1. The light (transmission signal light) emitted from the light emitting element 1 passes through the lens 2, passes through the wavelength separating filter 3 after being refracted by the lens 2, and is focused on the optical fiber 4. The wavelength separating filter 3 is arranged to have an inclination of an angle of about 45 degrees with respect to a longitudinal direction of the optical fiber 4 within a tangential plane. However, this angle is a value that depends on the design of an optical system of the optical module, which is not limited to 45 degrees, so that it can be any value determined according to the design of the optical system.

In the present embodiment, because the light emitting element 1 is offset with respect to the central axis A of the lens 2, an output angle of the light output from the lens 2 is determined by optical characteristics of the lens 2 and the like and an arrangement of each constituent element. A polishing angle of the optical fiber 4 is a polishing angle that enables achieving the highest coupling efficiency. Instead of adjusting the polishing angle, the optical fiber 4 can be inclined such that the coupling efficiency is increased. Furthermore, the light emitting element 1 and the lens 2 can be formed in an integrated manner.

Operations and effects of the present embodiment are described below. The light emitted from the light emitting element 1 passes through the lens 2 and the wavelength separating filter 3, and is focused on the optical fiber 4. At this time, by arranging the light emitting element 1 with an offset from the central axis A of the lens 2 such that astigmatism generated by the wavelength separating filter 3 is canceled, it is possible to correct astigmatism and to increase the coupling efficiency.

An astigmatic difference $\Delta z$ generated when light passes through a wavelength separating filter having a parallel flat-plate structure can be represented approximately by the following Equation (1).

[Equation (1)]

$$\Delta Z = Qt - Qs = \frac{d}{n\cos\left(\frac{\theta}{n}\right)}\left(1 - \frac{\cos^2\theta}{\cos^2\frac{\theta}{n}}\right) \quad (1)$$

In the Equation (1), Qt is an image point on a tangential plane, and Qs is an image point on a sagittal plane. The tangential plane is a plane including an optical axis and a main light beam, which is a plane where the inclination of the wavelength separating filter 3 appears. The sagittal plane is a plane perpendicular to the tangential plane including the main light beam. $\theta$ is an incident angle of the light on the wavelength separating filter 3, n is a refractive index of the wavelength separating filter 3, and d is a thickness of the wavelength separating filter 3.

As can be understood from the Equation (1) described above, $\Delta z$ is equal to or larger than zero. That is, an imaging point on the sagittal plane is shorter than an imaging point of the tangential plane. Such astigmatism generated by the wavelength separating filter 3 can be canceled by arranging the light emitting element 1 with an offset from the central axis of the lens 2. It can be qualitatively interpreted as follows in the Seidel third-order aberrations.

When the light emitting element 1 is arranged out of the central axis of the lens 2, an image height h' is determined corresponding to a height of an object point (corresponding to the offset amount of the light emitting element 1 with respect to the lens 2). Image point tangle errors $\Delta zt$ and $\Delta zs$ of the tangential plane and the sagittal plane corresponding to the image height h' in the longitudinal direction can be calculated by the following Equation (2).

[Equation (2)]

$$\Delta Z'_t = \frac{-h'^2}{2}n'3III, \Delta Z'_s = \frac{-h'^2}{2}n'III \quad (2)$$

In the Equation (2), III is an astigmatism coefficient, which is a sum of astigmatism coefficients generated at planes in the optical system, and n' is a refractive index of a medium at the image point. An astigmatic difference $\Delta z'$ due to the arrangement of the light emitting element 1 out of the central axis of the lens 2 becomes $\Delta z'=(\Delta zt-\Delta zs)=-nh'^2III$.

Therefore, in the optical system in which a condition of III>0 is satisfied, astigmatism is generated by arranging the object point out of the axis (arranging the light emitting element 1 out of the central axis of the lens 2), and the image point on the tangential plane becomes shorter than the image point on the sagittal plane. Therefore, the astigmatic difference generated by the wavelength separating filter 3 can be canceled by the astigmatic difference generated by offsetting the light emitting element 1 from the central axis A of the lens 2.

Generally, when the object point is longer than the focal length, and in a range where the light emitted from a light emitting element is focused, the astigmatism coefficient III is larger than zero at a focusing lens (a convex lens), and therefore it is possible to cancel an aberration by arranging the object point out of the axis. Note that, although the explanation given here is approximate and qualitative, which may lack strictness, this is an explanation of a principle that astigmatism can be canceled by arranging the light emitting element 1 out of the axis of the lens 2 to make the image point position on the tangential plane shorter than the image point position on the sagittal plane.

Meanwhile, when the light emitted from the light emitting element 1 is focused on the optical fiber 4, the coupling efficiency can be calculated by a convolution integral of a complex amplitude of an electric field of the light emitted from the light emitting element 1 and a complex amplitude of an electric field of the light output from the optical fiber 4 as follows.

[Equation (3)]

$$\frac{\left|\int\int fL(x, y) * fr(x, y) dx dy\right|^2}{\int\int fL(x, y) fL(x, y) * dx dy \int\int fr(x, y) fr(x, y) * dx dy} \quad (3)$$

In the Equation (3), fL(x, y) is a complex amplitude of the light emitted from the light emitting element 1 and fr(x, y) is a complex amplitude of the light output from the optical fiber 4. "x" and "y" are an x-coordinate value and a y-coordinate value on a plane perpendicular to the optical axis (xy plane), respectively. "*" is complex conjugate. If the light is focused on the optical fiber 4 without displacing a wave front of the light emitted from the light emitting element 1, that is, without any shifting of the phase, it is possible to achieve a high coupling efficiency; however, if the phases of the complex amplitudes of the electric fields of the light emitting element 1 and the optical fiber 4 are shifted from each other due to an influence of an aberration, the coupling efficiency is degraded. When the wavelength separating filter 3 is arranged between the light emitting element 1 and the optical fiber 4 as shown in FIG. 1, an aberration is generated by the wavelength separating filter 3, and as a result, the coupling efficiency is degraded.

Figure 2:
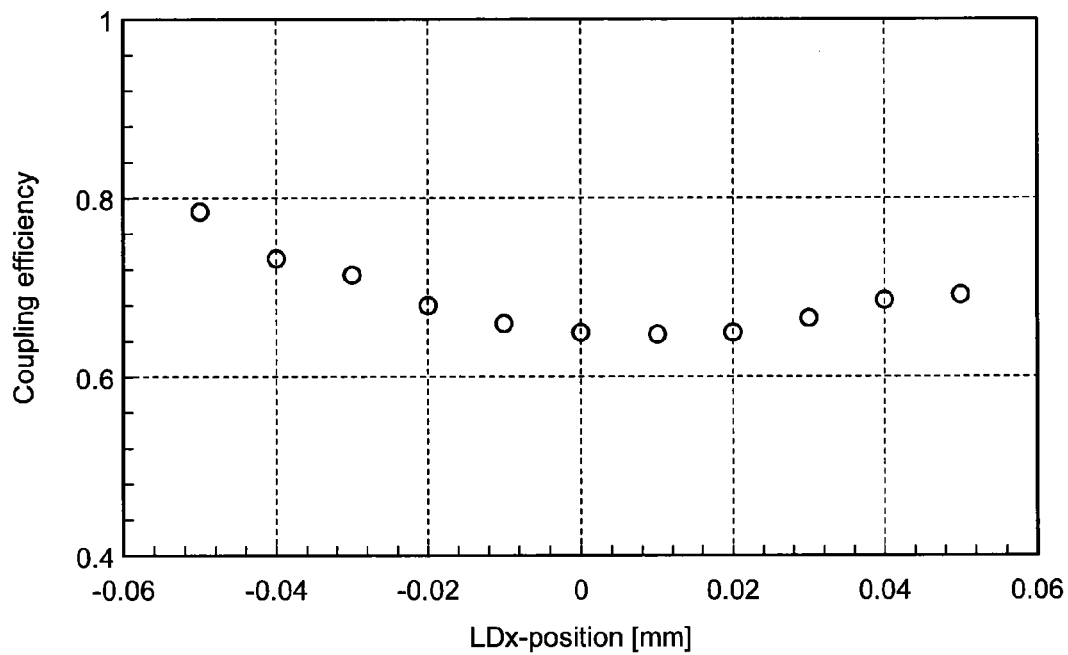
FIG. 2 depicts a simulation result of coupling efficiency.

FIG. 2 depicts a simulation result of the coupling efficiency. A result obtained by a simulation of the coupling efficiency base on the Equation (3) described above is shown in FIG. 2, where the light emitted from the light emitting element 1 is assumed to be a Gaussian beam, the optical fiber 4 is assumed to be a single mode fiber, the thickness of the wavelength separating filter 3 is assumed to be 0.3 millimeter, and the inclination angle of the wavelength separating filter 3 is assumed to be 45 degrees. The horizontal axis of the graph shown in FIG. 2 represents the offset amount from the central axis A of the lens 2 to the light emitting element 1, and the vertical axis represents the coupling efficiency to the optical fiber. In this case, for example, a traveling direction of the light emitted from the light emitting element 1 before being incident on the lens 2 is taken as the z axis, and a direction of the offset of the light emitting element 1 with respect to the central axis A of the lens 2 (a direction perpendicular to the central axis A of the lens 2 on the tangential plane) is taken as the x axis. In FIG. 1, the right direction is taken as the +z axis, and the upward direction is taken as the +x direction. Furthermore, the x-coordinate value of the central axis A of the lens 2 is taken as 0. In this case, in the example shown in FIG. 1, because the light emitting element 1 has the offset amount B in the downward direction with respect to the central axis A of the lens 2, the offset is in the − direction of the x axis. From the simulation result shown in FIG. 2, it is understood that the coupling efficiency is increased as the position of the light emitting element 1 is shifted from the central axis A of the lens 2.

Figure 3:
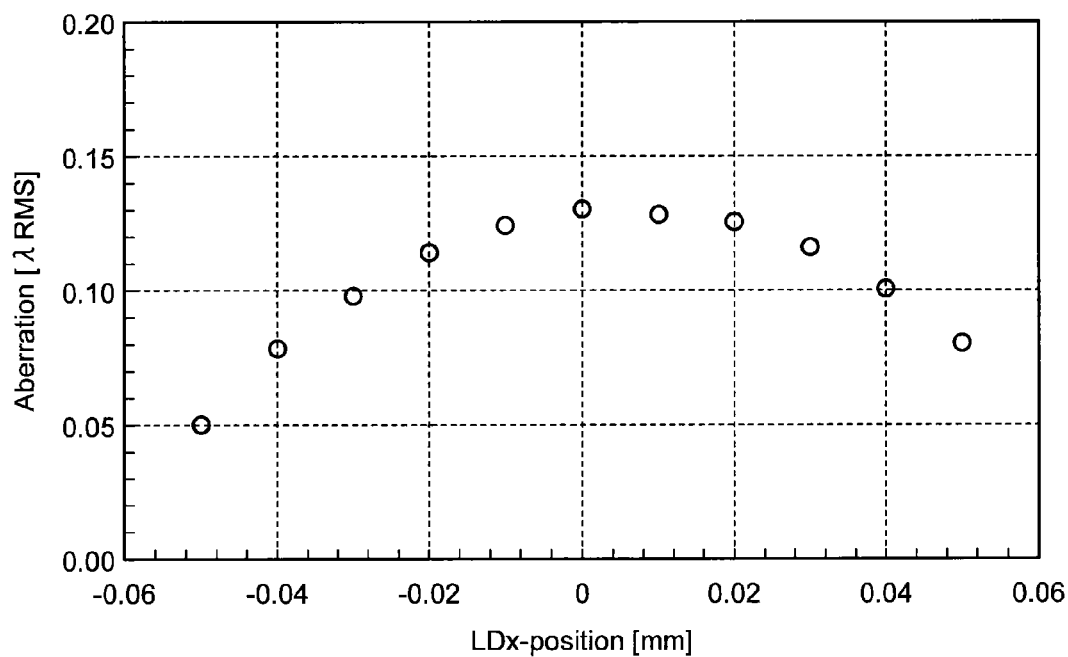
FIG. 3 depicts a simulation result of an astigmatism amount.

FIG. 3 depicts a simulation result of an astigmatism amount. The condition of the simulation is identical to that of the simulation shown in FIG. 2. It is understood that the aberration amount is decreased as the position of the light emitting element 1 is shifted from the central axis A of the lens 2 (an absolute value of the offset amount B is increased). Therefore, by arranging the light emitting element 1 out of the axis with the offset from the central axis A of the lens 2 on the tangential plane, it is possible to cancel the astigmatism caused by the wavelength separating filter 3, thus increasing the coupling efficiency.

The reason why the result of the simulation of the coupling efficiency and the aberration amount for the position of the light emitting element 1 with respect to the central axis A of the lens 2 are changed in an asymmetric manner is because the incident angle of the light is changed due to the wavelength separating filter 3 so that an aberration generated by the wavelength separating filter 3 is different in the + direction and the − direction on the x-coordinate. For example, in the example shown in FIG. 2, the coupling efficiency is increased more when the light emitting element 1 is offset in the −x direction than when the light emitting element 1 is offset in the + direction. This asymmetric characteristic is determined by the optical performance and arrangement of the entire optical system and the like. Therefore, by setting the offset amount of the light emitting element 1 considering the + direction and the − direction on the x-coordinate according to the optical performance and the arrangement of the entire optical system, it is possible to reduce the aberration and obtain the optimum coupling efficiency.

While a case where the light emitted from the light emitting element 1 is focused on the optical fiber 4 via the lens 2 and the wavelength separating filter 3 is described in the present embodiment, the astigmatism compensation according to the present embodiment can be similarly applied to a case of an optical reception module in which the light output from the optical fiber is focused on a light receiving element via the lens and the wavelength separating filter. That is, by offsetting the light emitting element 1 in the same manner with respect to the central axis of the lens for focusing the light on the light receiving element, the aberration of the light output from the optical fiber 4 is canceled in the same manner as described above, and appropriate coupling to the light receiving element is obtained.

In this manner, in the present embodiment, the light emitting element 1 is arranged to be offset with respect to the central axis A of the lens 2 in the direction perpendicular to the central axis A of the lens on the tangential plane. Therefore, the astigmatism generated by the light passing through the wavelength separating filter 3 is canceled by the astigmatic difference generated by the offset. Accordingly, it is possible to suppress degradation of the coupling efficiency due to astigmatism to achieve a high coupling efficiency.

Second Embodiment

Figure 4:
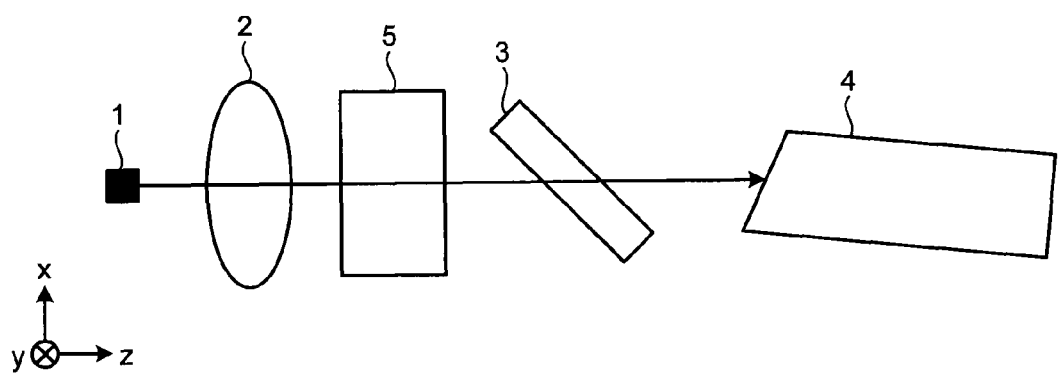
FIG. 4 is a configuration example of an optical module according to a second embodiment.
Figure 5:
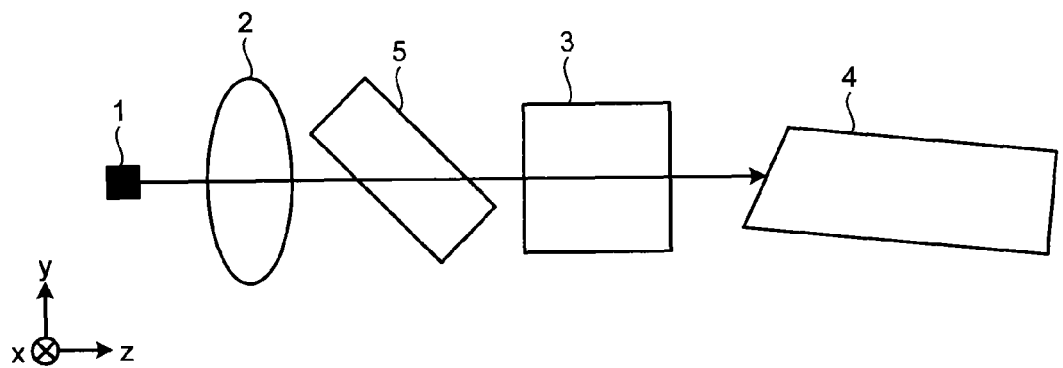
FIG. 5 is a configuration example of the optical module according to the second embodiment.

FIGS. 4 and 5 are configuration examples of an optical module according to a second embodiment of the present invention. In FIG. 4 and FIG. 5, the traveling direction of the light emitted from the light emitting element 1 before being incident on the lens 2 is taken as the z axis, where FIG. 4 is a plan view of the xz plane and FIG. 5 is a plan view of the yz plane.

As shown in FIGS. 4 and 5, the optical module according to the present embodiment includes the light emitting element 1, the lens 2, the wavelength separating filter 3, the optical fiber 4, and a glass substrate 5 having a parallel flat-plat structure. Constituent elements in the present embodiment having functions identical to those of the first embodiment are denoted by like reference signs in the first embodiment and explanations thereof will be omitted. In the present embodiment, the light emitting element 1 is not offset with respect to the central axis of the lens 2, and is arranged on the central axis of the lens 2.

As shown in FIG. 4, the wavelength separating filter 3 has an inclination of about 45 degrees around the y axis with respect to the optical fiber 4. The glass substrate 5 has an inclination on a plane other than a plane perpendicular to the central axis of the lens 2 among planes perpendicular to the plane where the wavelength separating filter 3 has the inclination (the wavelength separating filter 3 has the inclination on the plane including the central axis of the lens 2 among the planes perpendicular to the plane where the wavelength separating filter 3 has the inclination). That is, in the example shown in FIG. 4, because the wavelength separating filter 3 has the inclination around the y axis, it has the inclination on the xz plane. Therefore, as shown in FIG. 5, the glass substrate 5 has the inclination on the plane other than the xy plane that is a plane perpendicular to the central axis of the lens 2 among the xy plane and yz plane that are perpendicular to the xz plane, that is, on the yz plane (the glass substrate 5 has the inclination around the x axis).

The astigmatic difference caused by arranging the glass substrate 5 as described above is generated in a direction of canceling astigmatism generated by the wavelength separating filter 3. That is, the astigmatic difference generated by the glass substrate 5 makes an astigmatic difference having a negative value of $\Delta z$ in the Equation (1) described above. Therefore, an aberration generated by the wavelength separating filter 3 can be canceled, and as a result, the coupling efficiency is enhanced. It is preferred that the glass substrate 5 has an AR (Anti Reflection) coating with respect to a wavelength of the light emitting element 1. Operations of the present embodiment other than those described above are identical to those of the first embodiment.

While the glass substrate 5 has been explained as an example here, the present invention is not limited thereto, and any member other than the glass substrate 5 can be used so long as the member is a dielectric medium.

In this manner, in the present embodiment, the glass substrate 5 is arranged between the lens 2 and the wavelength separating filter 3, and the glass substrate 5 is designed to have an inclination on the plane other than the plane perpendicular to the central axis of the lens 2 among the planes perpendicular to the plane where the wavelength separating filter 3 has the inclination. Therefore, the astigmatism generated by the light passing through the wavelength separating filter 3 is canceled by the astigmatic difference generated by the light passing though the glass substrate 5. Accordingly, it is possible to suppress degradation of the coupling efficiency due to astigmatism to achieve a high coupling efficiency.

Third Embodiment

Figure 6:
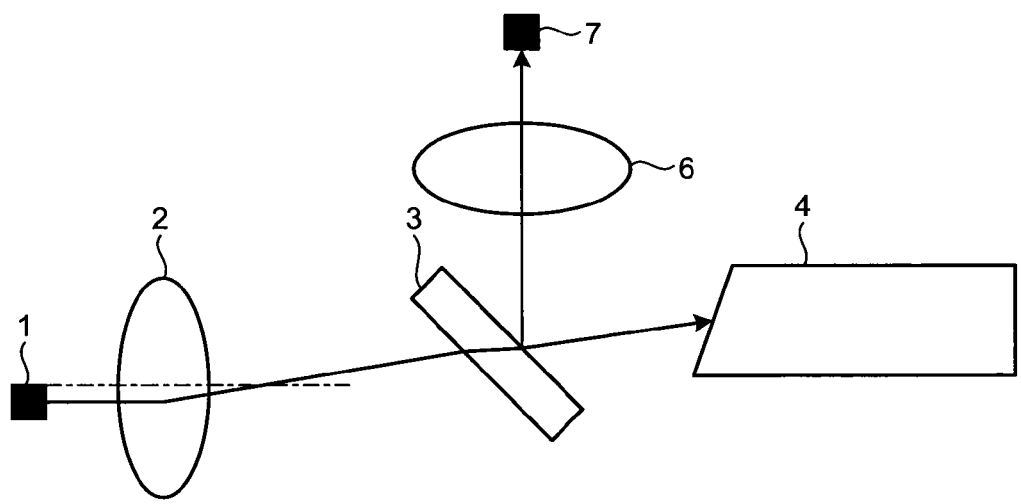
FIG. 6 is a configuration example of an optical module according to a third embodiment.

FIG. 6 is a configuration example of an optical module according to a third embodiment of the present invention. The optical module according to the present embodiment is a transmission and reception optical module having a transmission and reception function, and includes the light emitting element 1, the lens 2, the wavelength separating filter 3, the optical fiber 4, a lens 6, and a light receiving element 7. Constituent elements in the present embodiment having functions identical to those of the first embodiment are denoted by like reference signs in the first embodiment and explanations thereof will be omitted. In the present embodiment, similarly to the first embodiment, the light emitting element 1 is arranged while being offset respect to the central axis of the lens 2.

In the present embodiment, the light output from the optical fiber 4 is reflected at the wavelength separating filter 3 to a side of the light receiving element 7 and focused on the light receiving element 7 by the lens (light-receiving-side lens) 6. The light receiving element 7 and the lens 6 can be formed in an integrated manner. Furthermore, the glass substrate 5 can be arranged similarly to the second embodiment, without offsetting the light emitting element 1 with respect to the central axis of the lens 2. Operations of the present embodiment other than those described above are identical to those of the first embodiment.

In this manner, in the present embodiment, similarly to the first embodiment, the light emitting element 1 is offset with respect to the central axis of the lens 2 in the transmission and reception optical module having the transmission and reception function. Therefore, in the transmission and reception optical module, it is possible to suppress degradation of the coupling efficiency due to astigmatism to achieve a high coupling efficiency.

Fourth Embodiment

Figure 7:
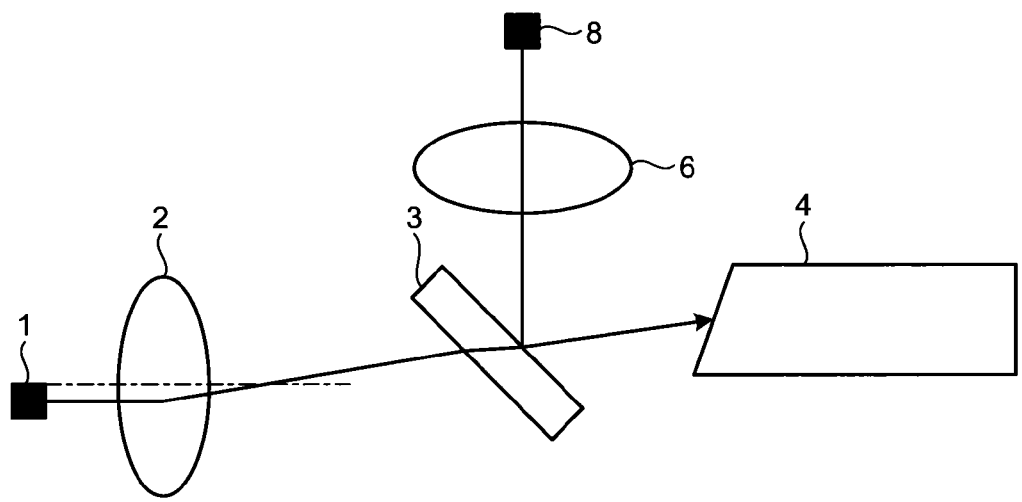
FIG. 7 is a configuration example of an optical module according to a fourth embodiment.

FIG. 7 is a configuration example of an optical module according to a fourth embodiment of the present invention. The optical module according to the present embodiment includes the light emitting element 1, the lens 2, the wavelength separating filter 3, the optical fiber 4, the lens 6, and a light emitting element 8. Constituent elements in the present embodiment having functions identical to those of the first embodiment are denoted by like reference signs in the first embodiment and explanations thereof will be omitted. In the present embodiment, similarly to the first embodiment, the light emitting element 1 is arranged while being offset respect to the central axis of the lens 2.

The light emitted from the light emitting element 8 is reflected at the wavelength separating filter 3 to a side of the optical fiber 4 and focused on the optical fiber 4. Operations of the present embodiment other than those described above are identical to those of the first embodiment.

As shown in FIG. 7, in the optical module including two light emitting elements, the light emitted from the light emitting element 1 passes through the wavelength separating filter 3 similarly to the first embodiment; however, because the light emitting element 1 is offset with respect to the central axis of the lens 2 similarly to the first embodiment, astigmatism caused by the wavelength separating filter 3 is compensated. Meanwhile, the light emitted from the light emitting element 8 is reflected at the wavelength separating filter 3 to the side of the optical fiber 4 after passing through the lens 6. At this time, because a reflection angle of the light becomes $\pm 2\theta$ with respect to a mounting angle accuracy $\pm \theta$ of the wavelength separating filter 3, an influence of the mounting angle accuracy of the wavelength separating filter 3 on the coupling efficiency to the optical fiber 4 is relatively large. Therefore, it is preferred to increase the mounting angle accuracy of the wavelength separating filter 3. In the present embodiment, the lens 6 functions as a transmission-side lens.

While a case where two light emitting elements are employed has been explained in the present embodiment, when the number of light emitting elements is three or more, light emitting elements that emit light that passes through the wavelength separating filter 3 can be arranged while being offset with respect to center axes of respective lenses for focusing the light such that astigmatism caused by the wavelength separating filter 3 is compensated.

In this manner, in the present embodiment, in the optical module having two or more light emitting elements, similarly to the first embodiment, the light emitting element 1 is offset with respect to the central axis of the lens 2. Therefore, in the optical module having two or more light emitting elements, it is possible to suppress degradation of the coupling efficiency due to astigmatism to achieve a high coupling efficiency.

Fifth Embodiment

Figure 8:
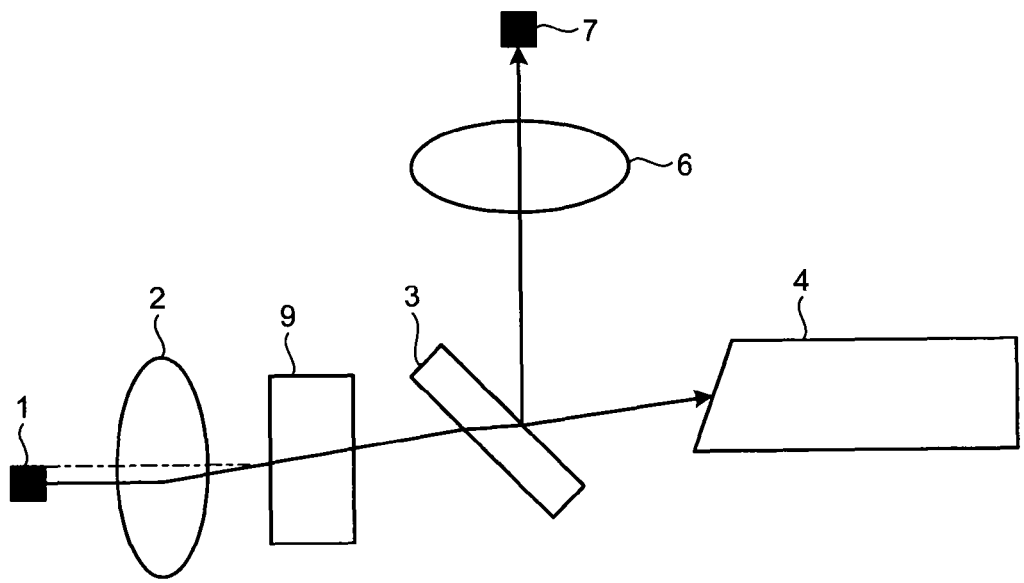
FIG. 8 is a configuration example of an optical module according to a fifth embodiment.

FIG. 8 is a configuration example of an optical module according to a fifth embodiment of the present invention. The optical module according to the present embodiment includes the light emitting element 1, the lens 2, the wavelength separating filter 3, the optical fiber 4, the lens 6, the light receiving element 7, and an optical isolator 9. The optical module according to the present embodiment is constituted by adding the optical isolator 9 to the optical module according to the third embodiment. Constituent elements in the present embodiment having functions identical to those of the third embodiment are denoted by like reference signs in the third embodiment and explanations thereof will be omitted. In the present embodiment, similarly to the first embodiment, the light emitting element 1 is arranged while being offset respect to the central axis of the lens 2.

In the present embodiment, the optical isolator 9 is arranged between the lens 2 and the wavelength separating filter 3. Therefore, effects identical to those of the first embodiment can be obtained, and by providing the optical isolator 9, it is possible to stabilize the output of the light source by blocking a back reflection light of the light emitted from the light emitting element 1 and preventing an input of the light having the same wavelength as that of the light emitting element 1, which enters into the optical module from the optical fiber 4, to the light emitting element 1.

Sixth Embodiment

Figure 9:
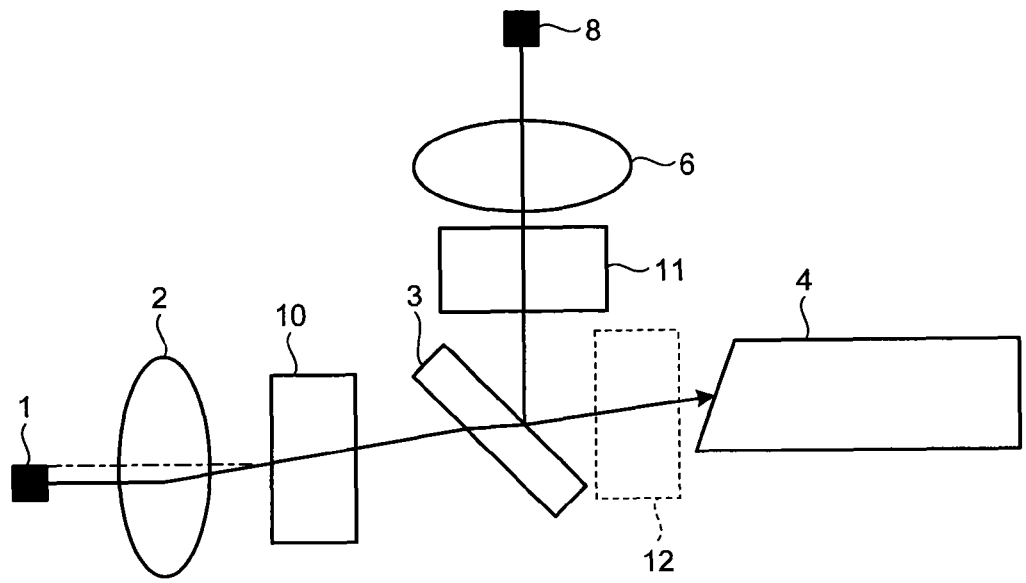
FIG. 9 is a configuration example of an optical module according to a sixth embodiment.

FIG. 9 is a configuration example of an optical module according to a sixth embodiment of the present invention. The optical module according to the present embodiment includes the light emitting element 1, the lens 2, the wavelength separating filter 3, the optical fiber 4, the lens 6, the light emitting element 8, and optical isolators 10 and 11. The optical module according to the present invention is obtained by adding the optical isolators 10 and 11 to the optical module according to the fourth embodiment. Constituent elements in the present embodiment having functions identical to those of the fourth embodiment are denoted by like reference signs in the fourth embodiment and explanations thereof will be omitted. In the present embodiment, similarly to the first embodiment, the light emitting element 1 is arranged while being offset respect to the central axis of the lens 2.

In the present embodiment, the optical isolator 10 is arranged between the lens 2 and the wavelength separating filter 3, and the optical isolator 11 is arranged between the lens 6 and the wavelength separating filter 3. With this arrangement, it is possible to stabilize the output of the light source by blocking back reflection light of the light emitted from the light emitting element 1 and the light emitted from the light emitting element 8 and preventing an input of the light having the same wavelengths as those of the light emitting element 1 and the light emitting element 8, which enter into the optical module from the optical fiber 4, to the light emitting element 1 and the light emitting element 8, respectively.

Furthermore, instead of arranging the two optical isolators 10 and 11, an optical isolator 12 can be arranged between the optical fiber 4 and the wavelength separating filter 3. In this case, a cost-reduction effect can be obtained because only one isolator is needed. In addition, because distances from the lens 2 and the lens 6 to the optical isolator 12 increases, and an effective area of the optical isolator 12 can be reduced, thereby leading to a further cost reduction.

Seventh Embodiment

Figure 10:
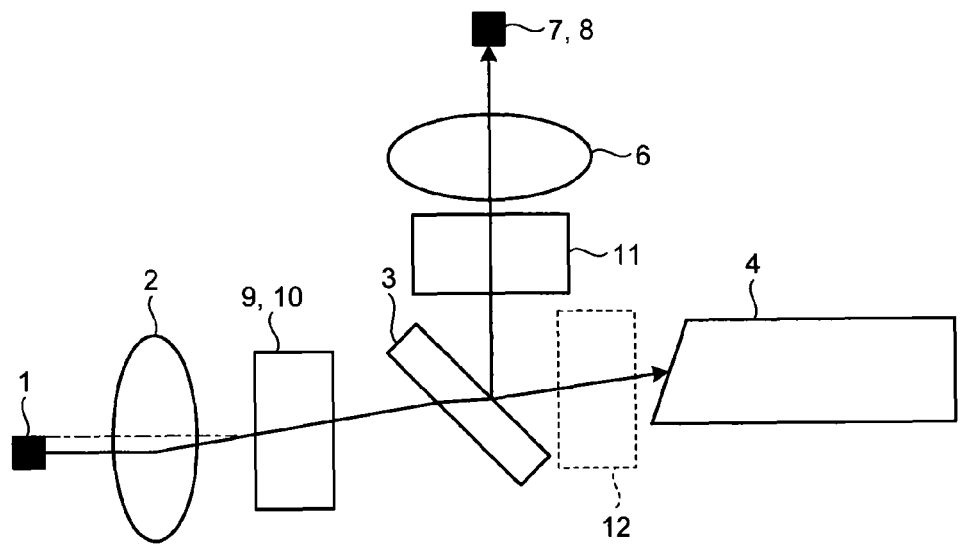
FIG. 10 is a configuration example of an optical module according to a seventh embodiment.

FIG. 10 is a configuration example of an optical module according to a seventh embodiment of the present invention. The configuration of the optical module according to the present embodiment is identical to that of the optical module according to the fifth embodiment or the sixth embodiment. Constituent elements in the present embodiment having functions identical to those of the fifth or sixth embodiment are denoted by like reference signs in the fifth or sixth embodiment and explanations thereof will be omitted. In the present embodiment, similarly to the first embodiment, the light emitting element 1 is arranged while being offset respect to the central axis of the lens 2.

In the present embodiment, in the optical module according to the fifth embodiment or the sixth embodiment, the optical isolators 9 and 10 arranged between the lens 2 and the wavelength separating filter 3 are designed such that a Faraday rotator constituting the optical isolator is a parallel flat-plate, and this parallel flat-plate has an inclination in a direction perpendicular to the inclination angle of the wavelength separating filter 3 (the parallel flat-plate has an inclination on a plane including the central axis of the lens 2 among the planes perpendicular to the plane where the wavelength separating filter 3 has the inclination). By designing thickness and angle of the optical isolators 9 and 10 having the above configuration such that an aberration in the entire optical system is decreased, for example, the aberration can be further compensated in addition to the compensation of the aberration by the light emitting element 1 arranged out of the central axis of the lens 2. In a case of arranging the optical isolator 12 in the sixth embodiment, the aberration can be compensated by the optical isolator 12.

In the configuration of performing the compensation by using the optical isolator in the above manner as described above, similarly to the second embodiment, the glass substrate 5 can be arranged with an inclination between the lens 2 and the optical fiber 4 without offsetting the light emitting element 1 with respect to the central axis of the lens 2. In addition, the aberration can be compensated by the optical isolators 9 and 10 without offsetting the light emitting element 1 with respect to the central axis of the lens 2 and further without providing the glass substrate 5.

Eighth Embodiment

Figure 11:
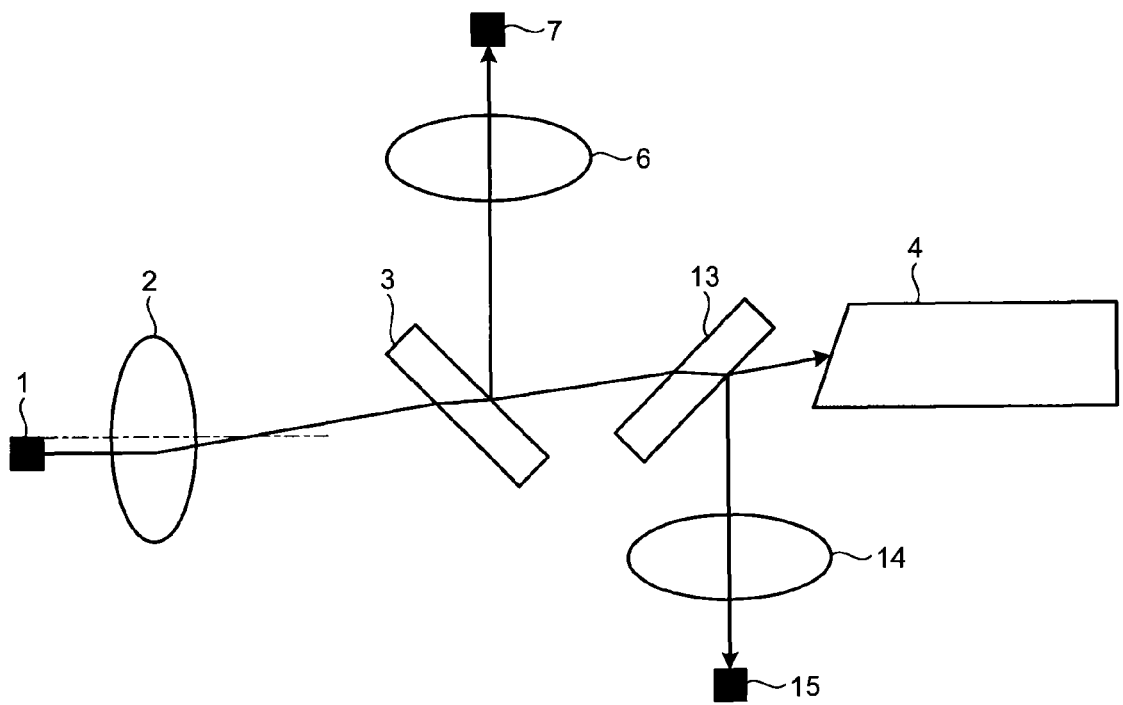
FIG. 11 is a configuration example of an optical module according to an eighth embodiment.

FIG. 11 is a configuration example of an optical module according to an eighth embodiment of the present invention. The configuration of the optical module according to the present embodiment is obtained by adding a wavelength separating filter 13, a lens 14, and a light receiving element 15 to the optical module according to the third embodiment. Constituent elements in the present embodiment having functions identical to those of the third embodiment are denoted by like reference signs in the third embodiment and explanations thereof will be omitted. In the present embodiment, similarly to the first embodiment, the light emitting element 1 is arranged while being offset respect to the central axis of the lens 2.

In the present embodiment, the light reflected at the wavelength separating filter 13 to a side of the light receiving element 15 among the light output from the optical fiber 4 is focused on the light receiving element 15 by the lens 14. Furthermore, the light transmitted the wavelength separating filter 13 among the light output from the optical fiber 4 is reflected at the wavelength separating filter 3 and is focused on the light receiving element 7 by the lens 6. The light emitted from the light emitting element 1 passes through the wavelength separating filter 3, further passes through the wavelength separating filter 13, and the is focused on the optical fiber 4. Therefore, an aberration is increased as compared to the first embodiment. Accordingly, by setting the offset amount of the light emitting element 1 with respect to the central axis of the lens 2 according to the aberration caused by the wavelength separating filter 3 and the wavelength separating filter 13, the aberration can be canceled. In addition, because an emission angle of the light after passing through the lens 2 differs, a high coupling efficiency can be achieved by adjusting the polishing angle of the optical fiber 4 or the angle of the optical fiber 4 to an optimum value according to the emission angle.

The lens 14 and the light receiving element 15 can be formed in an integrated manner. Furthermore, an optical isolator can be arranged between the lens 2 and the wavelength separating filter 3. In addition, as described in the seventh embodiment, an optical isolator having the aberration compensating function can be provided. Further, as described in the second embodiment, the light emitting element 1 can be arranged on the central axis of the lens 2 and the glass substrate 5 having the aberration compensating function can be provided.

In this manner, in the present embodiment, in the case where the light emitted from the light emitting element 1 passes through two wavelength separating filters (the wavelength separating filter 3 and the wavelength separating filter 13), the offset amount of the light emitting element 1 with respect to the central axis of the lens 2 is set according to an aberration caused by the two wavelength separating filters. Therefore, even when the light emitted from the light emitting element 1 passes through two wavelength separating filters, effects identical to those of the first embodiment can be obtained.

Ninth Embodiment

Figure 12:
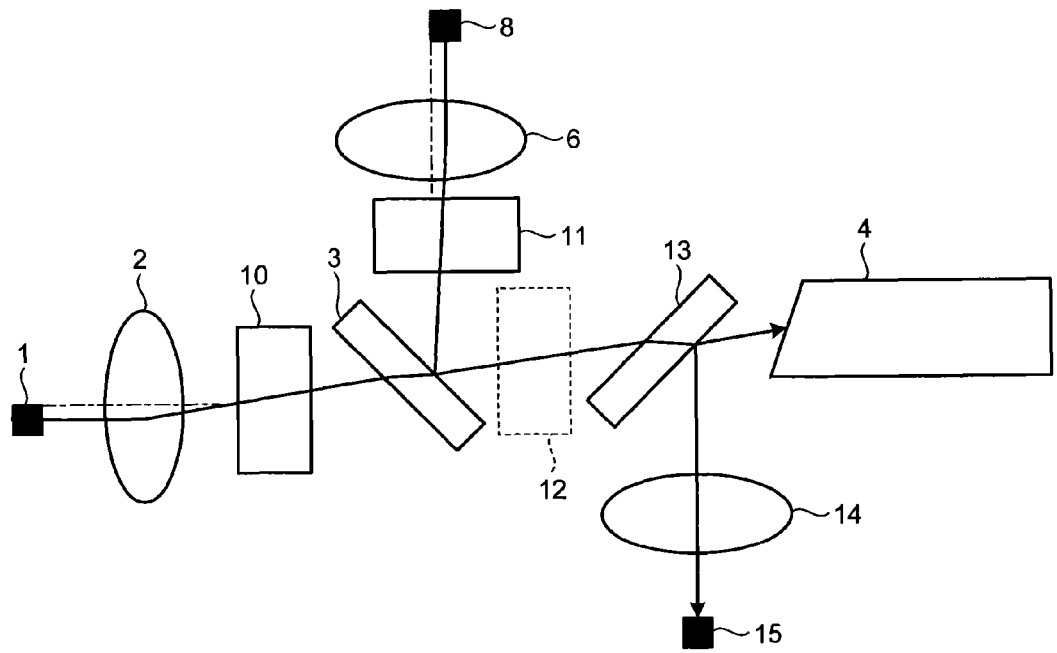
FIG. 12 is a configuration example of an optical module according to a ninth embodiment.

FIG. 12 is a configuration example of an optical module according to a ninth embodiment of the present invention. Similarly to the eighth embodiment, the configuration of the optical module according to the present embodiment is obtained by adding the wavelength separating filter 13, the lens 14, and the light receiving element 15 to the optical module according to the sixth embodiment. Constituent elements in the present embodiment having functions identical to those of the sixth or eighth embodiment are denoted by like reference signs in the sixth or eighth embodiment and explanations thereof will be omitted. In the present embodiment, similarly to the first embodiment, the light emitting element 1 is arranged while being offset respect to the central axis of the lens 2.

In the present embodiment, an aberration is generated because the light emitted from the light emitting element 8 passes through the wavelength separating filter 13. Therefore, by arranging the light emitting element 8 while being offset with respect to the central axis of the lens 6, the aberration caused by the wavelength separating filter 13 can be compensated and a high coupling efficiency can be achieved also for the light emitted from the light emitting element 8.

The optical isolators 10 and 11 (or the optical isolator 12) according to the present embodiment can be substituted with the optical isolator having a structure that can compensate for the aberration as described in the seventh embodiment. In addition, similarly to the second embodiment, the light emitting element 1 can be arranged on the central axis of the lens 2, and the glass substrate 5 can be arranged with an inclination between the lens 2 and the wavelength separating filter 13. Furthermore, similarly, the light emitting element 8 can be arranged on the central axis of the lens 6, and the glass substrate 5 can be arranged with an inclination between the lens 6 and the wavelength separating filter 13. Further, the aberration can be compensated by the optical isolators 10 and 11 (or the optical isolator 12) without offsetting the light emitting element 1 with respect to the central axis of the lens 2 and without providing the glass substrate 5.

Tenth Embodiment

Figure 13:
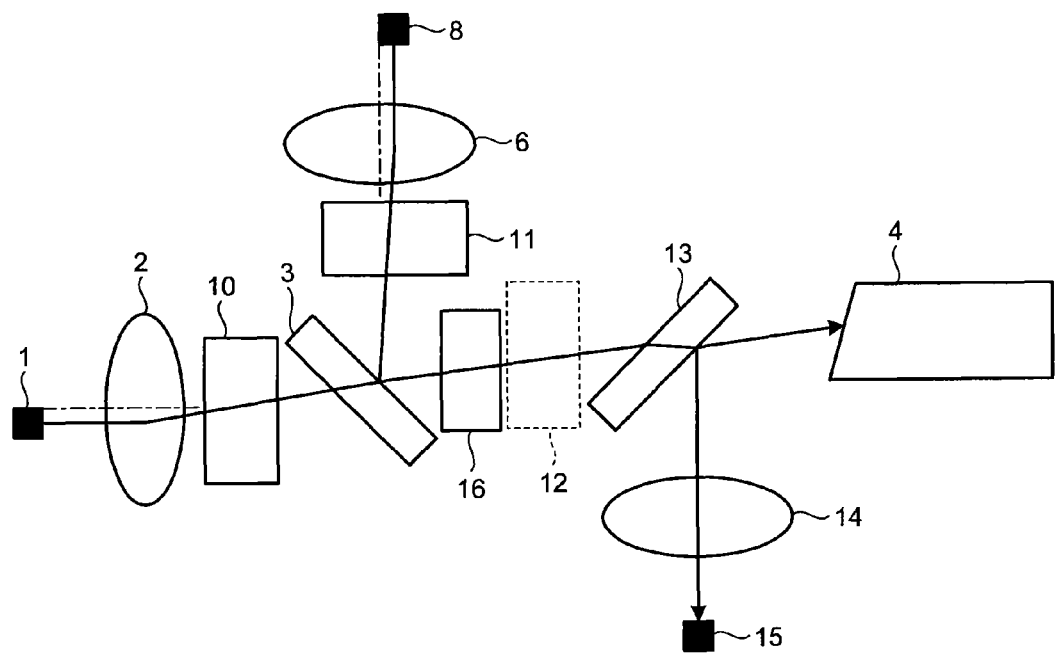
FIG. 13 is a configuration example of an optical module according to a tenth embodiment.

FIG. 13 is a configuration example of an optical module according to a tenth embodiment of the present invention. The configuration of the optical module according to the present embodiment is obtained by adding a lens (a lens between filters) 16 to the optical module according to the ninth embodiment. Constituent elements in the present embodiment having functions identical to those of the ninth embodiment are denoted by like reference signs in the ninth embodiment and explanations thereof will be omitted. In the present embodiment, similarly to the first embodiment, the light emitting element 1 is arranged while being offset respect to the central axis of the lens 2.

In the present embodiment, the lens 16 is arranged between the wavelength separating filter 3 and the wavelength separating filter 13. It is arranged that the light emitted from the light emitting element 1 and the light emitted from the light emitting element 8 pass through the center of a front-side main plane of the lens 16. That is, the lens 16 is arranged such that an incident angle and an output angle on the lens 16 are equal to each other, so that the aberration on the lens 16 is most minimized. By arranging the lens 16 in this manner, a distance between each light emitting element and the optical fiber 4 can be increased, and a distance between the lens 2 and the optical isolator 10 and a distance between the lens 6 and the optical isolator 11 can be increased. As a result, the effective area of the isolator can be reduced, thereby leading to a cost reduction. The lens 16 can be also arranged between the optical fiber 4 and the wavelength separating filter 13.

Eleventh Embodiment

Figure 14:
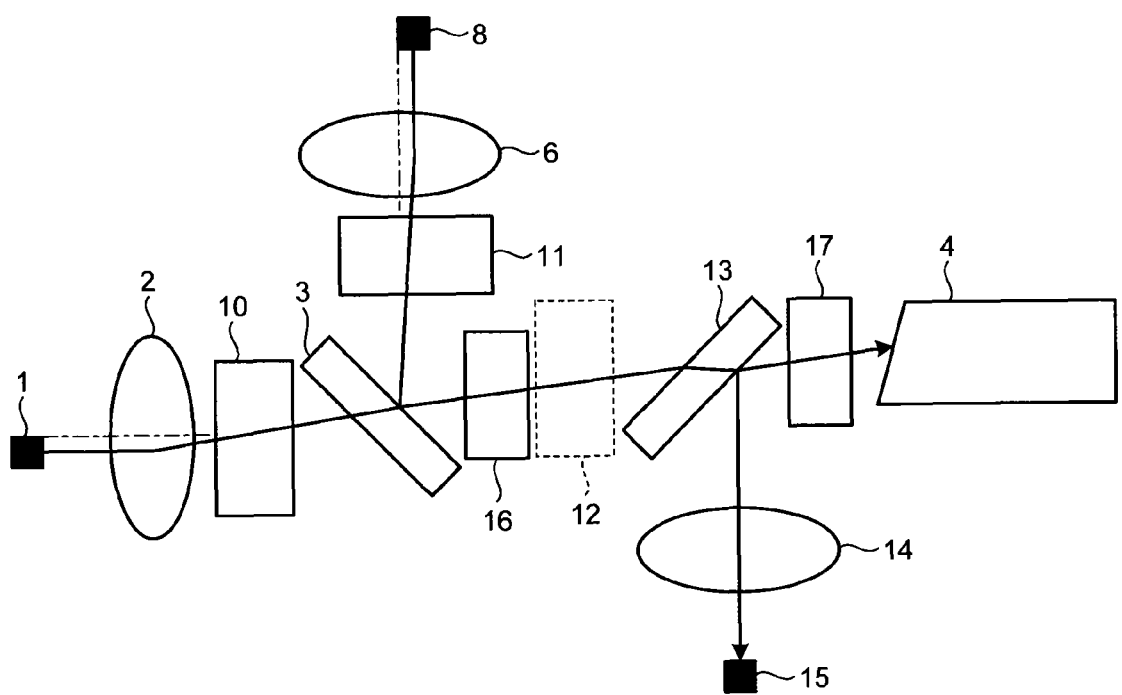
FIG. 14 is a configuration example of an optical module according to an eleventh embodiment.

FIG. 14 is a configuration example of an optical module according to an eleventh embodiment of the present invention. The configuration of the optical module according to the present embodiment is obtained by adding a lens (a lens between a filter and an optical fiber) 17 to the optical module according to the tenth embodiment. Constituent elements in the present embodiment having functions identical to those of the tenth embodiment are denoted by like reference signs in the tenth embodiment and explanations thereof will be omitted. In the present embodiment, similarly to the first embodiment, the light emitting element 1 is arranged while being offset respect to the central axis of the lens 2.

In the present embodiment, the lens 17 is arranged between the optical fiber 4 and the wavelength separating filter 13. It is arranged that the light emitted from the light emitting element 1 and the light emitted from the light emitting element 8 pass through the centers of the front-side main planes of the lens 16 and the lens 17. That is, the lenses 16 and 17 are arranged such that incident angles and output angles on the lenses 16 and 17 are equal to each other, respectively, so that aberrations on the lenses 16 and 17 are most minimized.

The light emitting element 8 is arranged on the central axis of the lens 6. Furthermore, it is configured such that the image point of the light emitting element 1 and the image point of the light emitting element 8 are located on the focal point position of the lens 16, and the light between the lens 16 and the lens 17 is set to be collimated light. By setting the light passing through the wavelength separating filter 13 as collimated light in the above manner, aberrations are hardly generated at the wavelength separating filter 13 so that the light emitted from the light emitting element 8 is focused on the optical fiber 4 without being affected by aberrations.

Meanwhile, because the light emitted from the light emitting element 1 passes through the wavelength separating filter 3 as non-collimated light, an aberration is generated by the wavelength separating filter 3. Therefore, similarly to the first embodiment, the aberration is compensated by offsetting the light emitting element 1 with respect to the central axis of the lens 2.

In the present embodiment, similarly to the tenth embodiment, the distance between each light emitting element and the optical fiber 4 can be increased, and the distance between the lens 2 and the optical isolator 10 and the distance between the lens 6 and the optical isolators 10 and 11 can be increased. As a result, the effective area of the optical isolator can be reduced, thereby leading to a cost reduction.

INDUSTRIAL APPLICABILITY

As described above, the optical module according to the present invention is useful for a communication optical transceiver module, and is particularly suitable for a communication optical transceiver module that uses a wavelength separating filter that is arranged with an inclination on the communication optical transceiver module.

REFERENCE SIGNS LIST

1, 8 light emitting element
2, 6, 14, 16, 17 lens
3, 13 wavelength separating filter
4 optical fiber
5 glass substrate
7, 15 light receiving element
9, 10, 11, 12 optical isolator

The invention claimed is:
1. An optical module comprising:
a light emitting element;
an optical fiber;
a wavelength separating filter that generates an astigmatism and is arranged at a predetermined angle with respect to a longitudinal direction of the optical fiber on a plane including the longitudinal direction of the optical fiber; and
a transmission-side lens for focusing light emitted from the light emitting element on the optical fiber via the wavelength separating filter, wherein
the light emitting element is offset by an amount in a direction perpendicular to a central axis of the transmission-side lens on a plane where the wavelength separating filter has the predetermined angle with respect to the central axis of the transmission-side lens, the offset amount being of an extent to cancel astigmatism generated by the wavelength separating filter.
2. An optical module comprising:
a light emitting element;
an optical fiber;
a wavelength separating filter that generates an astigmatism and is arranged at a predetermined angle with respect to a longitudinal direction of the optical fiber on a plane including the longitudinal direction of the optical fiber;
a transmission-side lens for focusing light emitted from the light emitting element on the optical fiber via the wavelength separating filter; and
a dielectric medium substrate that is arranged between the transmission-side lens and the wavelength separating filter such that the dielectric medium substrate has an inclination on a plane having a central axis of the transmission-side lens among planes perpendicular to a plane where the wavelength separating filter has the predetermined angle such that an astigmatic difference caused by the dielectric medium substrate is generated in a direction to cancel astigmatism generated by the wavelength separating filter.
3. An optical module comprising:
a light emitting element;
an optical fiber;
a wavelength separating filter that generates an astigmatism and is arranged at a predetermined angle with respect to a longitudinal direction of the optical fiber on a plane including the longitudinal direction of the optical fiber;
a transmission-side lens for focusing light emitted from the light emitting element on the optical fiber via the wavelength separating filter; and
an optical isolator that includes a Faraday rotator as a parallel flat-plate and is arranged between the transmission-side lens and the wavelength separating filter such that the parallel flat-plate has an inclination on a plane including a central axis of the transmission-side lens among planes perpendicular to a plane where the wavelength separating filter has the predetermined angle that causes a decrease of the astigmatic aberration due to the wavelength separating filter.
4. The optical module according to claim 1, further comprising:
a light receiving element; and
a light-receiving-side lens, wherein
the wavelength separating filter is configured to reflect light output from the optical fiber and to cause the reflected light to be incident on the light-receiving-side lens, the light-receiving-side lens focusing the light reflected from the wavelength separating filter on to the light receiving element.
5. The optical module according to claim 2, further comprising:
a light receiving element; and
a light-receiving-side lens, wherein
the wavelength separating filter is configured to reflect light output from the optical fiber and to cause the reflected light to be incident on the light-receiving-side lens, the light-receiving-side lens focusing the light reflected from the wavelength separating filter on to the light receiving element.
6. The optical module according to claim 1, further comprising an optical isolator that is arranged between the transmission-side lens and the wavelength separating filter.
7. The optical module according to claim 6, wherein
a Faraday rotator that constitutes the optical isolator is formed as a parallel flat-plate, and
the parallel flat-plate has an inclination on the plane including the central axis of the transmission-side lens among the planes perpendicular to the plane where the wavelength separating filter has the predetermined angle.
8. The optical module according to claim 4 wherein
the wavelength separating filter is a first wavelength separating filter, the light-receiving-side lens is a first light-receiving-side lens, and the light receiving element is a first light receiving element, and
the optical module further comprises:
a second light receiving element;
a second wavelength separating filter that is arranged between the optical fiber and the first wavelength separating filter and is configured to transmit one part of the light output from the optical fiber to pass through a side of the second wavelength separating filter, to reflect another part of the light output from the optical fiber other than the one part of the light, and to cause the reflected light to be incident on a second light-receiving-side lens; and the second light-receiving-side lens focusing the light incident on the second light-receiving-side lens reflected from the second wavelength separating filter on the second light receiving element.

9. The optical module according to claim 1, wherein
the wavelength separating filter is a first wavelength separating filter, and
the optical module further comprises:
a light receiving element;
a second wavelength separating filter that is arranged between the optical fiber and the first wavelength separating filter such that the second wavelength separating filter has a predetermined inclination angle with respect to a longitudinal direction of the optical fiber on a plane including the longitudinal direction of the optical fiber and is configured to transmit one part of the light output from the optical fiber to pass through a side of the first wavelength separating filter, to reflect another part of the light output from the optical fiber other than the one part of the light, and to cause the reflected light to be incident on a light-receiving-side lens; and
the light-receiving-side lens for focusing the light incident on the light-receiving-side lens reflected from the second wavelength separating filter on the light receiving element.

10. The optical module according to claim 9, wherein
the transmission-side lens is a first transmission-side lens, and
the optical module further comprises:
a first optical isolator that is arranged between the first transmission-side lens and the first wavelength separating filter;
a second optical isolator that is arranged between a second transmission-side lens and the first wavelength separating filter; and
an intermediate lens that is arranged between the first wavelength separating filter and the second wavelength separating filter.

11. The optical module according to claim 1, wherein
the wavelength separating filter is a first wavelength separating filter and the transmission-side lens is a first transmission-side lens, and
the optical module further comprises:
a light receiving element;
a second wavelength separating filter that is arranged between the optical fiber and the first wavelength separating filter and is configured to transmit one part of the light output from the optical fiber to pass through a side of the second wavelength separating filter, to reflect another part of the light output from the optical fiber other than the one part of the light, and to cause the reflected light to be incident on a light-receiving-side lens;
the light-receiving-side lens focusing the light incident on the light-receiving-side lens reflected from the second wavelength separating filter on the light receiving element;
a first optical isolator that is arranged between the first transmission-side lens and the first wavelength separating filter;
a second optical isolator that is arranged between a second transmission-side lens and the first wavelength separating filter;

an intermediate lens that is arranged between the first wavelength separating filter and the second wavelength separating filter; and
an optical fiber coupling lens that is arranged between the second wavelength separating filter and the optical fiber, and The intermediate lens is configured to collimate the light reflected at the first wavelength separating filter and to cause the collimated light to be incident on the second wavelength separating filter.

12. The optical module according to claim 5, wherein
the wavelength separating filter is a first wavelength separating filter, the light-receiving-side lens is a first light-receiving-side lens, and the light receiving element is a first light receiving element, and
the optical module further comprises:
a second light receiving element;
a second wavelength separating filter that is arranged between the optical fiber and the first wavelength separating filter and is configured to transmit one part of the light output from the optical fiber to pass through a side of the second wavelength separating filter, to reflect another part of the light output from the optical fiber other than the one part of the light, and to cause the reflected light to be incident on a second light-receiving-side lens; and
the second light-receiving-side lens focusing the light incident on the second light-receiving-side lens reflected from the second wavelength separating filter on the second light receiving element.

13. The optical module according to claim 2, wherein
the wavelength separating filter is a first wavelength separating filter, and
the optical module further comprises:
a light receiving element;
a second wavelength separating filter that is arranged between the optical fiber and the first wavelength separating filter such that the second wavelength separating filter has a predetermined inclination angle with respect to a longitudinal direction of the optical fiber on a plane including the longitudinal direction of the optical fiber and is configured to transmit one part of the light output from the optical fiber to pass through a side of the second wavelength separating filter, to reflect another part of the light output from the optical fiber other and the one part of the light, and to cause the reflected light to be incident on a light-receiving-side lens; and
the light-receiving-side lens focusing the light incident on the light-receiving-side lens reflected from the second wavelength separating filter on the light receiving element.

14. The optical module according to claim 13, wherein
the transmission-side lens is a first transmission-side lens, and
the optical module further comprises:
a first optical isolator that is arranged between the first transmission-side lens and the first wavelength separating filter;
a second optical isolator that is arranged between a second transmission-side lens and the first wavelength separating filter; and
an intermediate lens that is arranged between the first wavelength separating filter and the second wavelength separating filter.

15. The optical module according to claim 2, wherein
the wavelength separating filter is a first wavelength separating filter and the transmission-side lens is a first transmission-side lens, and
the optical module further comprises:
a light receiving element;
a second wavelength separating filter that is arranged between the optical fiber and the first wavelength separating filter and is configured to transmit one part of the light output from the optical fiber to pass through a side of the second wavelength separating filter, to reflect another part of the light output from the optical fiber other than the one part of the light, and to cause the reflected light to be incident on a light-receiving-side lens;
the light-receiving-side lens focusing the light incident on the light-receiving-side lens reflected from the second wavelength separating filter on the light receiving element;
a first optical isolator that is arranged between the first transmission-side lens and the first wavelength separating filter;
a second optical isolator that is arranged between a second transmission-side lens and the second first wavelength separating filter;
an intermediate lens that is arranged between the first wavelength separating filter and the second wavelength separating filter; and
an optical fiber coupling lens that is arranged between the second wavelength separating filter and the optical fiber, and
the intermediate lens is configured to collimate the light reflected at the first wavelength separating filter and to cause the collimated light to be incident on the second wavelength separating filter.

16. The optical module according to claim 3, further comprising:
a light receiving element; and
a light-receiving-side lens, wherein
the wavelength separating filter is configured to reflect light output from the optical fiber and to cause the reflected light to be incident on the light-receiving-side lens, the light-receiving-side lens focusing the light reflected from the wavelength separating filter on to the light receiving element.

17. The optical module according to claim 16, wherein
the wavelength separating filter is a first wavelength separating filter, the light-receiving-side lens is a first light-receiving-side lens, and the light receiving element is a first light receiving element, and
the optical module further comprises:
a second light receiving element;
a second wavelength separating filter that is arranged between the optical fiber and the first wavelength separating filter and is configured to transmit one part of the light output from the optical fiber to pass through a side of the first wavelength separating filter, to reflect another part of the light output from the optical fiber other than the one part of the light, and to cause the reflected light to be incident on a second light-receiving-side lens; and
the second light-receiving-side lens focusing the light incident on the second light-receiving-side lens reflected from the second wavelength separating filter on the second light receiving element.

18. The optical module according to claim 3, wherein
the wavelength separating filter is a first wavelength separating filter and the transmission-side lens is a first transmission-side lens, and
the optical module further comprises:
a light receiving element;
a second wavelength separating filter that is arranged between the optical fiber and the first wavelength separating filter such that the second wavelength separating filter has a predetermined inclination angle with respect to a longitudinal direction of the optical fiber on a plane including the longitudinal direction of the optical fiber and is configured to transmit one part of the light output from the optical fiber to pass through a side of the second wavelength separating filter, to reflect another part of the light output from the optical fiber other and the one part of the light, and to cause the reflected light to be incident on a light-receiving-side lens; and
a light-receiving-side lens focusing the light incident on the light-receiving-side lens reflected from the second wavelength separating filter on the light receiving element.

19. The optical module according to claim 18, further comprising:
a first optical isolator that is arranged between the first transmission-side lens and the first wavelength separating filter;
a second optical isolator that is arranged between the second transmission-side lens and the first wavelength separating filter; and
an intermediate lens that is arranged between the first wavelength separating filter and the second wavelength separating filter.

20. The optical module according to claim 3, wherein
the wavelength separating filter is a first wavelength separating filter and the transmission-side lens is a first transmission-side lens, and
the optical module further comprises:
a light receiving element;
a second wavelength separating filter that is arranged between the optical fiber and the first wavelength separating filter and is configured to transmit one part of the light output from the optical fiber to pass through a side of the second wavelength separating filter, to reflect another part of the light output from the optical fiber other than the one part of the light, and to cause the reflected light to be incident on a light-receiving-side lens;
the light-receiving-side lens focusing the light incident on the light-receiving-side lens reflected from the second wavelength separating filter on the light receiving element;
a first optical isolator that is arranged between the first transmission-side lens and the first wavelength separating filter;
a second optical isolator that is arranged between a second transmission-side lens and the first wavelength separating filter;
an intermediate lens that is arranged between the first wavelength separating filter and the second wavelength separating filter; and
an optical fiber coupling lens that is arranged between the second wavelength separating filter and the optical fiber, and the intermediate lens is configured to collimate the light reflected at the first wavelength separating filter and to cause the collimated light to be incident on the second wavelength separating filter.

* * * * *